United States Patent [19]

Hall

[11] Patent Number: 4,520,123
[45] Date of Patent: May 28, 1985

[54] CATALYST SYSTEM AND PROCESS FOR POLYMERIZING CONJUGATED DIENES

[75] Inventor: James E. Hall, Akron, Ohio

[73] Assignee: The Firestone Tire & Rubber Company, Akron, Ohio

[21] Appl. No.: 627,246

[22] Filed: Jul. 2, 1984

[51] Int. Cl.³ .............................................. C08F 4/48
[52] U.S. Cl. ..................................... 502/153; 502/156; 502/157; 526/177; 526/181
[58] Field of Search .................... 502/153, 156, 157

[56] References Cited

U.S. PATENT DOCUMENTS

| | | | |
|---|---|---|---|
| 3,091,606 | 5/1963 | Hsieh | 260/94.2 |
| 3,207,742 | 9/1965 | Van de Castle | 260/94.6 |
| 3,301,824 | 1/1967 | Hostettler et al. | 502/157 X |
| 3,377,404 | 4/1968 | Zelinski | 260/68.0 |
| 3,451,988 | 6/1969 | Langer, Jr. | 260/94.6 |
| 3,585,168 | 6/1971 | Inoue et al. | 502/157 X |
| 3,646,321 | 2/1972 | Siegla | 219/464 |
| 3,817,955 | 6/1974 | Kamienski et al. | 260/83.7 |
| 3,822,219 | 7/1974 | Kamienski et al. | 252/431 |
| 3,846,385 | 11/1974 | Hargis et al. | 260/80.7 |
| 3,847,883 | 11/1974 | Kamienski et al. | 260/83.7 |
| 4,139,490 | 2/1979 | Halasa et al. | 502/153 X |
| 4,264,753 | 4/1981 | Halasa et al. | 526/180 |
| 4,429,090 | 1/1984 | Hall | 502/157 X |
| 4,429,091 | 1/1984 | Hall | 502/157 X |

Primary Examiner—Patrick P. Garvin
Attorney, Agent, or Firm—Frank J. Troy, Sr.

[57] ABSTRACT

Conjugated dienes, in particular 1,3-conjugated dienes, can be polymerized or copolymerized using the catalyst system of this invention to polymers wherein the amount of 1,2-structure contained in the polymer is increased, and polymers can be prepared containing varying amounts of 1,2-structure as desired. Such desirable results can be obtained in accordance with the process of the present invention for polymerizing conjugated diene monomers which comprises the use of a catalyst system which comprises (a) at least one anionic initiator based on lithium, and (b) a modifier composition comprising at least one cyclic acetal of a glyoxal.

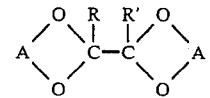

wherein R and R' are each independently hydrogen, alkyl or aryl groups, and each A is independently an alkylene or an oxyalkylene group.

In another embodiment, the catalyst system also contains at least one co-initiator selected from the group consisting of organomagnesium compounds, organoaluminum compounds, or mixtures thereof.

12 Claims, No Drawings

CATALYST SYSTEM AND PROCESS FOR POLYMERIZING CONJUGATED DIENES

BACKGROUND OF THE INVENTION

This invention relates to the polymerization of conjugated diene monomers, and to the polymerization of such monomers to polymers having increased amounts of 1,2-structure. More particularly, the invention relates to a catalyst system and the polymerization of conjugated dienes in the presence of such catalyst system which comprises an anionic initiator based on lithium, and at least one cyclic acetal of a glyoxal as a modifier.

The polymerization of conjugated dienes, and particularly of 1,3-dienes to useful rubbery polymers with various initiator systems is known. Such polymerizations can be initiated with organometallic compounds wherein the metal is a Group I metal such as lithium. For example, 1,3-dienes such as butadienes have been polymerized with butyl lithium in hydrocarbon diluents. The polymers prepared by this process generally contain large amounts of 1,4-structure and minor amounts of 1,2-structure. For many applications, it is desirable to increase the ratio of 1,2-structure in the polymers because this increases the cure rate in free radical cure systems. Such polymers and copolymers containing increased amounts of 1,2-structure are useful for tire rubbers, molded rubber goods, molding compounds, surface coatings, etc.

The use of mixtures of organometallic compounds for initiating polymerization of conjugated dienes has been suggested in several patents. For example, U.S. Pat. No. 3,646,321 describes the polymerization of conjugated dienes utilizing hydrocarbon-soluble organometallic complexes of metals of Group I and II(a) of the Periodic System. The complexes are exemplified by the complexes of di-n-butyl magnesium with n-butyl-lithium or n-butyl potassium. U.S. Pat. No. 3,847,883 also describes the use of complexes of diorganomagnesium compounds with various organometallic compounds of the metals of Group I.

U.S. Pat. No. 3,817,955 discloses the polymerization of conjugated dienes such as butadiene with a catalyst complex which comprises a dialkyl magnesium with either an alkali metal hydride or a tetraalkylammonium hydride. However, only low molecular weight polymers are reported. The use of a catalyst system comprising dibutyl magnesium and a barium dialkoxide such as barium di-tertiary butoxide is described in U.S. Pat. No. 3,846,385.

There also has been described in the prior art other catalyst or initiator systems which include organometallic compounds of the type described above which are modified by the inclusion of other materials. For example, U.S. Pat. No. 3,451,988 describes a polymerization catalyst for polymerizing vinyl compounds that utilizes mixtures of hydrocarbyl lithium and magnesium compounds, and a modifier which is a bi-functional Lewis base such as tertiary diamines including tetramethylethylene diamine.

U.S. Pat. No. 3,207,742 describes a process for preparing rubbery polymers of 1,3-dienes having an increased ratio of 1,2-structure. Such polymers are obtained by conducting a polymerization of a 1,3-diene in the presence of a lithium hydrocarbon catalyst, and a hexamethylphosphoramide modifier. The amount of the phosphoramide present is from about 10 to 0.1 mole percent based on the amount of diene present.

SUMMARY OF THE INVENTION

It now has been found that conjugated dienes, in particular 1,3-conjugated dienes, can be polymerized or copolymerized using the catalyst system of this invention to polymers wherein the amount of 1,2-structure contained in the polymer is increased, and polymers can be prepared containing varying amounts of 1,2-structure as desired. Such desirable results can be obtained in accordance with the process of the present invention for polymerizing conjugated diene monomers which comprises the use of a catalyst system which comprises (a) at least one anionic initiator based on lithium, and
(b) a modifier composition comprising at least one cyclic acetal of a glyoxal.

By utilizing such catalyst systems, it is possible to prepare polymers of conjugated dienes containing from 20 to 100% 1,2-structure of varying molecular weights over a wide range of temperatures. In a preferred embodiment, the modifier composition will comprise at least one cyclic acetal characterized by the formula

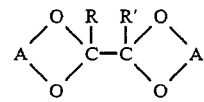

wherein R and R' are each independently hydrogen, alkyl or aryl groups, and each A is independently an alkylene or an oxyalkylene group.

In another embodiment, the catalyst system also contains at least one co-initiator selected from the group consisting of organomagnesium compounds, organoaluminum compounds, or mixtures thereof.

DESCRIPTION OF THE PREFERRED EMBODIMENTS

The present invention relates to a catalyst system for polymerizing conjugated diene monomers to polymers having increased amounts of 1,2-structure. The catalyst system comprises (a) at least one anionic initiator based on lithium, and
(b) a modifier composition comprising at least one cyclic acetal of a glyoxal. The catalyst system also may contain
(c) a co-initiator comprising at least one organomagnesium or organoaluminum compound as described in more detail below.

The process of the invention comprises conducting the polymerization or copolymerization of the conjugated diene in the presence of the catalyst systems of the invention.

MONOMERS

The conjugated diene monomers useful in the process of this invention generally are 1,3-dienes, and they contain from 4 to 12 carbon atoms and preferably from 4 to 8 carbon atoms per molecule. Examples of these dienes include the following: 1,3-butadiene, isoprene, 2,3-dimethyl-1,3-butadiene, 1,3-pentadiene (piperylene), 2-methyl-3-ethyl-1,3-butadiene, 3-methyl-1,3-pentadiene, 2-methyl-3-ethyl-1,3-pentadiene, 2-ethyl-1,3-pentadiene, 1,3-hexadiene, 2-methyl-1,3-hexadiene, 1,3-heptadiene, 3-methyl-1,3-heptadiene, 1,3-octadiene, 3-butyl-1,3-octadiene, 3,4-dimethyl-1,3-hexadiene, 3-n- propyl-1,3-pentadiene, 4,5-diethyl-1,3-octadiene, phenyl-1,3-butadiene, 2,3-diethyl-1,3-butadiene, 2,3-di-n-propyl-1,3-butadiene, 2-methyl-3-isopropyl-1,3-butadiene, and the like. Among the dialkyl butadienes, it is preferred that the alkyl groups contain from 1 to 3 carbon atoms. Conjugated dienes containing alkoxy substituents along the chain can also be employed, such as 2-methoxy-1,3-butadiene, 2-ethoxy-3-ethyl-1,3-butadiene, and 2-ethoxy-3-methyl-1,3-hexadiene. Conjugated dienes can be polymerized alone or in admixture with each other. Copolymers can also be prepared from two or more conjugated dienes by charging one compound initially, allowing it to polymerize, and then adding a second conjugated diene, and allowing it to polymerize.

In addition to homopolymers and copolymers of conjugated dienes, copolymers of conjugated dienes with other monomers containing a vinyl group ($CH_2=C<$), especially vinyl-substituted aromatic compounds, can be made by the process of this invention. The vinyl-substituted aromatic compounds include styrene, 1-vinylnaphthalene, 2-vinylnaphthalene, and alkyl, cycloalkyl, aryl, alkaryl, aralkyl, alkoxy, aryloxy, and dialkylamino derivatives thereof in which the total number of carbon atoms in the combined substituents is generally not greater than 12. Examples of these aromatic monomers include p-methylstyrene, alpha-methylstyrene, 3,5-diethylstyrene, 4-n-propylstyrene, 2,4,6-trimethylstyrene, 4-dodecylstyrene, 3-methyl-5-n-hexylstyrene, 4-cyclohexylstyrene, 4-phenylstyrene, 2-ethyl-4-benzylstyrene, 4-p-tolylstyrene, 3,5-tetramethylstyrene, 4-(4-phenyl-n-butyl)styrene, 3-(4-n-hexylphenyl)styrene, 4-methoxystyrene, 3,5-diphenoxystyrene, 2,6-dimethyl-4-hexoxystyrene, 4-dimethylaminostyrene, 3,5-diethylaminostyrene, 4-methoxy-6-di-n-propylaminostyrene, 4,5-dimethyl-1-vinylnaphthalene, 3-ethyl-1-vinylnaphthalene, 6-isopropyl-1-vinyl-naphthalene, 2,4-diisopropyl-1-vinylnaphthalene, 3,6-di-p-tolyl-1-vinylnaphthalene, 6-cyclohexyl-1-vinylnaphthalene, 4,5-diethyl-8-octyl-1-vinyl-naphthalene, 3,4,5,6-tetramethyl-1-vinylnaphthalene, 3,6-di-n-hexyl-1-vinylnaphthalene, 8-phenyl-1-vinyl-naphthalene, 5-(2,4,6-trimethylphenyl)-1-vinylnaphthalene, 3,6-diethyl-2-vinylnaphthalene, 7-dodecyl-2-vinylnaphthalene, 4-n-propyl-5-n-butyl-2-vinylnaphthalene, 6-benzyl-2-vinylnaphthalene, 3-methyl-5,6-diethyl-8-n-propyl-2-vinylnaphthalene, 4-p-tolyl-2-vinylnaphthalene, 5-(3-phenyl-n-propyl)-2-vinylnaphthalene, 4-methoxy-1-vinylnaphthalene, 6-phenoxyl-1-vinylnaphthalene, 3,6-dimethylamino-1-vinylnaphthalene, 7-dihexony-2-vinylnaphthalene, and the like. Other examples of vinyl substituted aromatic compounds are found in U.S. Pat. No. 3,377,404, the disclosure with respect to which is incorporated herein by reference. The amount of vinyl compound included in the polymer can be varied over a wide range depending on the desired copolymer properties. Generally at least one percent, and more preferably over five percent of the vinyl compound and up to 40% or even 85% based on the total weight of polymer can be included.

CATALYST SYSTEM

The catalyst system employed in this invention comprises
(a) an anionic initiator based on lithium,
(b) a modifier composition comprising at least one cyclic acetal of a glyoxal, and optionally,
(c) at least one organometallic magnesium or aluminum compound, or a mixture of such compounds.

The catalyst systems useful in the process of the invention are organometallic compounds wherein at least one of the metals is lithium. Other organometallic compounds which are useful in combination with the organolithium are organomagnesium and/or organoaluminum compounds.

INITIATORS

The anionic initiator compounds based on lithium (a) can be selected from any known organolithium compounds which are known in the art as being useful in the polymerization of 1,3-diene monomers. In general, the lithium compounds are hydrocarbyl lithium compounds of the formula $R(Li)_x$ wherein R represents hydrocarbyl groups containing from one to about 20 carbon atoms, and preferably from about 2 to 8 carbon atoms, and x is an integer from 1 to 4. Although the hydrocarbyl group preferably is an aliphatic group, the hydrocarbyl groups may also be cycloaliphatic or aromatic. The aliphatic groups may be primary, secondary or tertiary although the primary and secondary groups are preferred. Examples of aliphatic hydrocarbyl groups include methyl, ethyl, n-propyl, isopropyl, n-butyl, sec-butyl, t-butyl, n-amyl, sec-amyl, n-hexyl, sec-hexyl, n-heptyl, n-octyl, n-nonyl, n-dodecyl and octadecyl. The aliphatic groups may contain some unsaturation such as allyl, 2-butenyl, etc. Cycloalkyl groups are exemplified by cyclohexyl, methylcyclohexyl, ethylcyclohexyl, cycloheptyl, cyclopentylmethyl, methylcyclopentylethyl. Examples of aromatic hydrocarbyl groups include phenyl, tolyl, phenylethyl, benzyl, naphthyl, phenylcyclohexyl, etc.

Specific examples of organolithium compounds which are useful as anionic initiators in the polymerization of conjugated dienes in accordance with the process of this invention include the following: n-butyl lithium, n-propyl lithium, isobutyl lithium, tertiary butyl lithium, amyl lithium, cyclohexyl lithium.

Mixtures of different lithium initiator compounds also can be employed preferably containing one or more lithium compounds such as $R(Li)_x$. The preferred anionic initiator based on lithium is n-butyl lithium.

Other lithium catalysts which can be employed alone or in combination with the hydrocarbyl lithium initiators are lithium dialkyl amines, lithium dialkyl phosphines, lithium alkyl aryl phosphines, lithium diaryl phosphines, and lithium catalysts having the formula $RO(Li)_x$, wherein R and x are as defined above.

The organomagnesium and organoaluminum compounds (c) which may be included in the catalyst systems of the invention in combination with the lithium compound may be represented by the formulae $R_2Mg$ and $R_3Al$ where R represents hydrocarbyl groups as defined above. Preferably the R groups in the magnesium compound are alkyl groups containing 1 to 10 carbon atoms, and the R groups in the aluminum compound are alkyl groups containing 1 to 8 carbon atoms. The R groups may be the same or different.

Examples of suitable magnesium compounds include isopropyl-isobutyl magnesium, di-n-butyl magnesium, di-sec-butyl magnesium, sec-butyl-n-amyl magnesium, di-n-amyl magnesium, diisoamyl magnesium, dihexyl magnesiums, and dibenzyl magnesiums, dixylyl magnesiums. The preferred magnesium compounds are (n-butyl, sec-butyl) magnesium and di-n-butyl magnesium.

Examples of suitable trialkyl aluminum compounds include trimethyl aluminum, triethyl aluminum, tri(iso- or n-)propyl aluminum, tri-isobutyl or tri-n-butyl aluminum, etc. The preferred trialkyl aluminum compound for use in the present catalyst system is triethyl aluminum or triisobutyl aluminum.

As mentioned above, the polymerization initiators of the present invention may comprise mixtures of one or more of the above organometallic compounds provided that at least one of the metals is lithium. Examples of the mixtures of organometallics include the following: n-butyl lithium and di-n-butyl magnesium; n-butyl lithium, di-n-butyl magnesium and tri-n-butyl aluminum. In this specification and in the claims, the term co-initiator may be used to refer to the mixtures of the anionic lithium initiator with the magnesium and/or aluminum compounds.

The amount of initiator required to effect the desired polymerization can be varied over a wide range depending upon a number of factors such as the desired polymer molecular weight, the desired 1,2- and 1,4-content, and the desired physical properties for the polymer produced. For many applications, the preferred initiator composition is an hydrocarbyl lithium compound used alone. In these instances, the amount of initiator utilized may vary from as little as 0.20 millimole of lithium per 100 grams of conjugated diene monomer up to about 100 millimoles of lithium per 100 grams of conjugated diene depending upon the desired polymer molecular weight.

When the lithium initiators (a) are used in conjunction with (c), the magnesium or aluminum hydrocarbyl compounds, the ratio of the lithium to magnesium or aluminum metals can vary over a wide range such as within the molar ratio of 1: near 0 to 1:10. In some instances, there appears to be advantages in using the mixtures of organometallics since it appears that desired products can be obtained even though the amount of the lithium is reduced, and there further appears to be improved stability in the polymerization system.

MODIFIER COMPOSITION

In the process of the present invention, the polymerization of the conjugated diene monomers utilizing one or more of the above-described initiators is conducted in the presence of a modifier composition which comprises at least one cyclic acetal of a glyoxal. Such modifier compositions can be prepared by methods known in the art, and especially by the reaction of a glyoxal (Formula I) with one or more dihydric alcohols (Formula II).

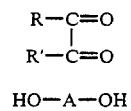

I

II

The cyclic acetals prepared as described above generally are characterized as having the formula

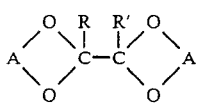

III

In general, R and R' in the above formulae are each independently hydrogen, alkyl or aryl groups, and each A is independently an alkylene or oxyalkylene group.

Examples of glyoxals which are represented by Formula I include glyoxal, dimethyl glyoxal (2,3-butanedione), diphenyl glyoxal (benzil), 1-phenyl-1,2-propanedione, methyl glyoxal and phenyl glyoxal.

The A group in Formulae II and III are alkylene or oxyalkylene groups which may be straight chain or branched chain groups containing from 1 to about 10 carbon atoms and optionally one or more oxy groups. Specific examples of such alkylene groups include —CH$_2$—CH$_2$, —CH(alk)—CH$_2$, —CH(alk)—CH—(alk)—, —C(alk)$_2$—CH$_2$—, —C(alk)$_2$—CH—(alk)—, —C(alk)$_2$—C(alk)$_2$—, —CH$_2$—CH$_2$—CH$_2$—, —CH(alk)—CH$_2$—CH$_2$—, —CH(alk)—CH(alk)—CH$_2$, —C(alk)$_2$—CH$_2$—CH$_2$—, etc., wherein each alk may be the same or different alkyl group such as methyl, ethyl, n-propyl, isopropyl, n-butyl, n-hexyl, etc.

Examples of A groups which are oxyalkylene groups include —CH$_2$—CH$_2$—O—CH$_2$—, —CH$_2$CH$_2$—O—CH$_2$—CH$_2$—, —CH$_2$—CH$_2$—O—CH$_2$—CH$_2$—CH$_2$—, the corresponding alkyl branched derivatives, etc.

The cyclic acetals useful as modifiers in the process of the invention can be prepared, for example, by mixing one mole of a glyoxal (40% solution in water) with two moles of a diol in a reaction flask equipped with a condenser and a Dean-Stark water trap. An appropriate amount of toluene and about 0.01 mole of an acid catalyst (e.g., p-toluene sulfonic acid) are added. The mixture is heated and a water/toluene azeotrope is distilled off at about 85° C. When all the water has been removed (including by-product water), the acetal has been formed. The product is purified by vacuum distillation, crystallization or sublimation. The water-free acetals can be stored as pure materials or dilute solutions in appropriate solvents can be prepared.

Specific examples of cyclic acetals of glyoxals which are useful as modifiers in the process of the invention and which have been prepared in the above manner include the following:

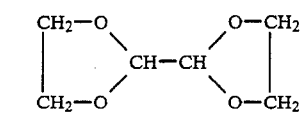

III(a)

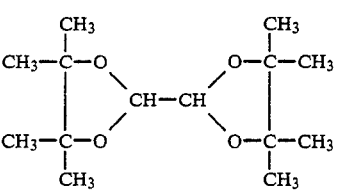

III(b)

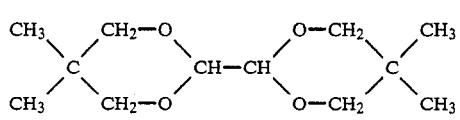

III(c)

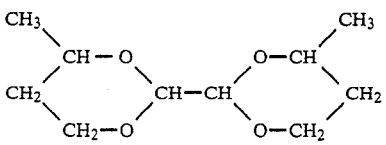

III(d)

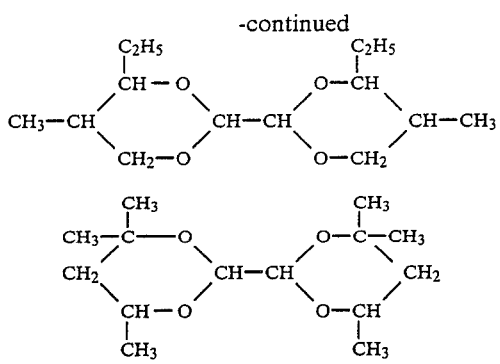

Further details regarding acetals III(a)–III(f) are summarized in the following Table I.

TABLE I

| Example | Diol Used | Melting Point (°C.) | Boiling Point (°C.) |
|---|---|---|---|
| III(a) | ethylene | 72–90 | sublimes |
| III(b) | pinacol | 75–80 | 100–110 at 3 mm. |
| III(c) | 2,2-dimethyl, 1,3-propane diol | 166 | — |
| III(d) | 1,3-butane diol | 37–85 | 128–132 at 2 mm. |
| III(e) | 2-methyl, 1,3-pentane diol | liquid | 95–105 at 0.2 mm. |
| III(f) | 2-methyl 2,4-pentane diol | 58–92 | 98–100 at 2.5 mm. |

The preparation of additional examples of cyclic acetals of glyoxals is described by M. M. Sprung and P. O. Guenther in the *Journal of the American Chemical Society*, Volume 73, pages 1884–1886 (1951), and the disclosure is hereby incorporated by reference.

The amount of cyclic modifier used in the polymerization reactions of this invention can be varied over a wide range, and generally will be used in an amount to provide a molar ratio of initiator (a) [or (a)+(c)] to modifier of from about 1:0.05 to 1:20.

In the polymerization of the conjugated dienes in accordance with the process of the invention, generally from 10 to 90%, and preferably 50 to 80% of an inert diluent is used during the polymerization to give better temperature control and to facilitate handling of the polymer.

Hydrocarbons generally are used as diluents. Hexane is preferred as well as other alkanes which generally contain 3 to 20 carbon atoms and more preferably 5 to 10 carbon atoms such as butane, pentane, heptane, octane, decane, etc. Cycloalkanes containing 5 to 20 and preferably 5 to 10 carbon atoms also are useful. Examples include cyclopentane, cyclohexane, methylcyclohexane and cycloheptane. Aromatic solvents such as toluene act as telomerizing agents and can be used when lower molecular weight polymers are desired. The diluents can be employed either alone or in combination, e.g., as a hydrocarbon distillate fraction.

The polymerization temperature may be from −20° C. to 200° C. or higher, but generally is conducted at a temperature between 0° to 160° C. The actual temperatures used will depend on the desired polymerization rate, product desired and the particular initiator/modifier system. The polymerization may be conducted under a negative pressure or an elevated pressure to avoid loss of monomer and solvent, particularly when the temperatures used are at or above the boiling point of one or both. Also, an inert atmosphere such as nitrogen can be used, and the usual precautions are taken to exclude materials such as water and air that will inactivate or poison the catalyst.

Samples may be withdrawn from the reactor periodically during the polymerization reaction to determine percent conversion (by measuring the total solids), color and character of the reaction mass. The reaction time of the polymerization is dependent upon the temperature and initiator concentration and varies from 0.5 hour to 24 hours or more to go to complete conversion to polymer. Depending on the initiator, modifier (b) and in particular the concentration of the organometallic initiator, the molecular weights of the products can be in the range of 1000 to 1,000,000, but preferably of 100,000 to 500,000 for use in rubber goods.

When the polymerization reaction has progressed to the desired degree, the product is dropped or run into isopropanol or other medium which deactivates the initiator and precipitates the polymer product. Generally, an amount of isopropanol equal in weight to the amount of diluent (hexane) used is sufficient. It also is advantageous to include an antioxidant such as about 1.0% of di-tertiary butyl-para-cresol in the isopropanol. The product is recovered and dried to remove solvent.

The process of the invention is illustrated by the following examples which are intended as illustrations and are not to be regarded as limiting the scope of the invention, or the manner in which it may be practiced.

In the following examples, the polymerizations are run in sealed bottles if the temperature is less than or equal to 80° C. The conjugated diene monomer is used as a 15% solution in hexane solvent which is dried to a water content of less than 10 parts per million. The initiator compounds or combinations thereof are used at appropriate levels to react with impurities and to effect polymerization to the desired molecular weight.

The general procedure used for conducting the polymerization at temperatures above 80° C. is as follows: a clean stainless steel reactor or sealed bottle equipped with stirrer, appropriate heating and cooling means and appropriate inlets and outlets is prepared for the reactions. There is charged into the reactor, under a nitrogen atmosphere, the conjugated diene/hexane solution followed by the initiator and modifier in the desired amounts. Unless otherwise indicated, the level of n-butyl lithium used in the examples is an amount sufficient to react with monomer and impurities to yield a polymer of 100,000 to 300,000 $\overline{M}_n$. The reactor temperature is raised to the desired temperature and maintained at that temperature for a period of the reaction. After the desired time of reaction, the reaction mass is dropped into an equal volume or more of isopropanol containing a small amount of antioxidant such as p-t-butyl-cresol. The precipitate is dried and then analyzed.

EXAMPLES A–C

In this series of reactions, 1,3-butadiene is polymerized utilizing n-butyl lithium as the initiator and modifier III(a) (reaction product of glyoxal with ethylene glycol). The modifier to initiator ratio in these examples is 2:1, and the reaction time is 18 hours. The results obtained by carrying out the reaction at three different reaction temperatures are summarized in the following Table II.

TABLE II

Polymerization of 1,3-Butadiene with Modifier III(a)

| Example | Temp. °C. | Yield % | 1,2-Content % |
|---|---|---|---|
| A | 5 | 72 | 77.9 |
| B | 30 | 92 | 67.2 |
| C | 50 | 87 | 52.2 |

EXAMPLES D-H

In this series of examples, 1,3-butadiene is polymerized utilizing n-butyl lithium as the initiator and the modifier identified above as III(b) (obtained by reacting glyoxal with pinacol). Further details of the procedure used in this series of experiments and analysis of the product are summarized in Table III.

TABLE III

Polymerization of 1,3-Butadiene with Modifier III(b)

| Example | Modifier/nBuLi Ratio | Temp. °C. | Time (hrs) | Yield (%) | 1,2-Content (%) |
|---|---|---|---|---|---|
| D | 2:1 | 5 | 22 | 93 | 90.7 |
| E | 2:1 | 30 | 23 | 99 | 82.4 |
| F | 2:1 | 50 | 23 | 95 | 72.9 |
| G | 2:1 | 70 | 21 | 99 | 59.0 |
| H | 1:1 | 100 | 1 | 86 | 32.0 |

EXAMPLES I-O

In this series of examples, 1,3-butadiene is polymerized utilizing n-butyl lithium as the initiator and modifier III(c). The details of the procedure and analysis of the products obtained are summarized in the following Table IV.

TABLE IV

Polymerization of 1,2-Butadiene with Modifier III(c)

| Example | Modifier/nBuLi Ratio | Temp. °C. | Time (hrs) | Yield (%) | 1,2-Content (%) |
|---|---|---|---|---|---|
| I | 2:1 | 5 | 22 | 99 | 78.5 |
| J | 2:1 | 30 | 23 | 97 | 72.8 |
| K | 2:1 | 50 | 23 | 96 | 67.9 |
| L | 2:1 | 70 | 21 | 98 | 64.1 |
| M | 2:1 | 95-115 | 1 | 89 | 47.7 |
| N | 2:1 | 100-115 | 0.5 | 100 | 43.3 |
| O | 4:1 | 100-110 | 0.5 | 97 | 53.0 |

EXAMPLES P-Q

In this series of examples, 1,3-butadiene is polymerized utilizing n-butyl lithium as the initiator and modifier III(d) prepared by reacting glyoxal with 1,3-butane diol. Further details of the reaction and of the analysis of the product are summarized in Table V.

TABLE V

Polymerization of 1,3-Butadiene with Modifier III(d)

| Example | Modifier/nBuLi Ratio | Temp. °C. | Time (hrs) | Yield (%) | 1,2-Content (%) |
|---|---|---|---|---|---|
| P | 2:1 | 5 | 22 | 98 | 81.0 |
| Q | 2:1 | 30 | 23 | 99 | 76.3 |
| R | 2:1 | 50 | 23 | 97 | 70.8 |
| S | 2:1 | 70 | 21 | 98 | 67.7 |
| T | 2:1 | 100 | 1 | 95 | 58.1 |
| U | 1:1 | 100-115 | 1 | 100 | 47.8 |

EXAMPLES V-AA

In this series of examples, 1,3-butadiene is polymerized utilizing n-butyl lithium as the initiator and modifier III(e) obtained by the reaction of glyoxal with 2-methyl-1,3-pentane diol. Additional details concerning the procedure and analysis of the product are summarized in the following Table VI.

TABLE VI

Polymerization of 1,3-Butadiene with Modifier III(e)

| Example | Modifier/nBuLi Ratio | Temp. °C. | Time (hrs) | Yield (%) | 1,2-Content (%) |
|---|---|---|---|---|---|
| V | 2:1 | 5 | 22 | 99 | 83.5 |
| W | 2:1 | 30 | 23 | 100 | 77.9 |
| X | 2:1 | 50 | 23 | 97 | 70.3 |
| Y | 2:1 | 70 | 21 | 98 | 65.5 |
| Z | 2:1 | 100 | 1 | 89 | 50.2 |
| AA | 1:1 | 40-120 | 0.5 | 89 | 62.9 |

EXAMPLES AB-AI

In this series of examples, 1,3-butadiene is polymerized using butyl lithium as the initiator and modifier III(f) obtained from the reaction of glyoxal with 2-methyl-2,4-pentane diol. Further details of the conditions of the reaction and analysis of the product are summarized in Table VII.

TABLE VII

Polymerization of 1,3-Butadiene with Modifier III(f)

| Example | Modifier/nBuLi Ratio | Temp. °C. | Time (hrs) | Yield (%) | 1,2-Content (%) |
|---|---|---|---|---|---|
| AB | 2:1 | 5 | 22 | 92 | 98.9 |
| AC | 2:1 | 30 | 23 | 100 | 96.3 |
| AD | 2:1 | 50 | 23 | 97 | 89.8 |
| AE | 2:1 | 70 | 21 | 91 | 83.6 |
| AF | 1:1 | 100-105 | 0.5 | 74 | 50.9 |
| AG | 3:2 | 100-120 | 0.5 | 74 | 49.1 |
| AH | 2:1 | 100-115 | 0.5 | 63 | 57.4 |
| AI | 4:1 | 100-110 | 0.5 | 55 | 69.9 |

The affect of temperature and the modifier/n-butyl lithium ratio on the percent 1,2-content in the polymer obtained by polymerizing 1,3-butadiene with modifier III(f) has been investigated by carrying out a series of reactions at various temperatures and at various modifier-to-initiator ratios while maintaining the remaining conditions constant. The 1,2-content of the polymers obtained from these reactions is summarized in the following Table VIII.

TABLE VIII

Affect of Temperature and Modifier/nBuLi Ratio on Percent 1,2-Content in Polybutadiene

| Temp. °C. | III(f)/nBuLi | | | | |
|---|---|---|---|---|---|
| | 0.5 | 1.0 | 2.0 | 4.0 | 10.0 |
| 5 | 97% | 100% | 100% | 100% | 98% |
| 30 | 91% | 98% | 98% | 97% | 99% |
| 50 | 80% | 91% | 93% | 95% | 94% |
| 70 | 63% | 78% | 86% | 93% | 95% |
| 80 | 43% | — | — | 84% | — |
| 100 | — | 51% | 62% | — | — |

EXAMPLE AJ

In this example, a monomeric mixture comprising 73.3% 1,3-butadiene and 26.7% styrene is polymerized using n-butyl lithium as the initiator and modifier III(f). The modifier to n-butyl lithium ratio is 1:1. The polymerization reaction temperature is maintained at 30° for a period of four hours. The copolymer is obtained at 99% yield, and the polybutadiene portion contains 85.1% of 1,2-structure.

EXAMPLE AK

A mixture containing 76% 1,3-butadiene and 24% styrene is polymerized using n-butyl lithium as the initiator and modifier III(e) in a molar ratio of modifier to n-butyl lithium of 1:1. The polymerization is conducted at 100° C. for a period of one hour and results in a polymer yield of 96%. The 1,2-content of the polybutadiene portion of the copolymer is 53.2%.

EXAMPLES AL-AX

In this series of examples, 1,3-butadiene is polymerized using a co-initiator system consisting of n-butyl lithium and n-butyl-s-butyl magnesium at different ratios, and using several of the modifiers of the invention. Further details of the reactants, reaction conditions and product analysis are found in the following Table IX.

TABLE IX

Co-Initiator Polymerization of 1,3-Butadiene

| Example | $R_2Mg$/RLi Ratio | Modifier | Modifier/Initiator Ratio | Temp. °C. | Time (hrs) | Yield (%) | 1,2-Content (%) |
|---|---|---|---|---|---|---|---|
| AL | 2:1 | IIIb | 2:1 | 30 | 22 | 70 | 83.4 |
| AM | 2:1 | IIIb | 2:1 | 70 | 22 | 25 | 58.4 |
| AN | 2:1 | IIIc | 2:1 | 30 | 22 | 100 | 74.5 |
| AO | 2:1 | IIIc | 2:1 | 70 | 22 | 93 | 64.1 |
| AP | 2:1 | IIId | 2:1 | 30 | 22 | 100 | 76.3 |
| AQ | 2:1 | IIId | 2:1 | 70 | 22 | 93 | 68.5 |
| AR | 2:1 | IIId | 1:1 | 100 | 1 | 91 | 48.9 |
| AS | 2:1 | IIIe | 2:1 | 30 | 22 | 100 | 77.6 |
| AT | 2:1 | IIIe | 2:1 | 70 | 22 | 93 | 67.0 |
| AU | 2:1 | IIIf | 2:1 | 30 | 22 | 93 | 96.6 |
| AV | 2:3 | IIIf | 2.4:1 | 5 | 22 | 100 | 100.0 |
| AW | 2:3 | IIIf | 2.4:1 | 30 | 22 | 100 | 100.0 |
| AX | 2:3 | IIIf | 2.4:1 | 70 | 22 | 99 | 86.5 |

EXAMPLES AY-BB

In this series of examples, 1,3-butadiene is polymerized utilizing n-butyl lithium and tri-n-butyl aluminum as the co-initiator system with various modifiers. The molar ratio of the tri-butyl aluminum to the butyl lithium is 2:3, the modifier-to-co-initiator molar ratio is 1:1, and the reaction temperature is maintained at 50° C. Additional details of the reactants, reaction conditions and analysis of the products are found in Table X.

TABLE X

Co-initiator Polymerization of 1,3-Butadiene

| Example | Modifier | Time (hrs) | Yield (%) | 1,2-Content (%) |
|---|---|---|---|---|
| AV | III(c) | 24 | 94 | 68.2 |
| AZ | III(d) | 24 | 84 | 74.6 |
| BA | III(e) | 24 | 95 | 71.5 |
| BB | III(f) | 24 | 25 | 87.1 |

The affect of the temperature and modifier-to-co-initiator ratio on the 1,2-content of polybutadiene is demonstrated by the following reactions which are summarized in Table XI. In this series of reactions, 1,3-butadiene is polymerized using n-butyl-s-butyl magnesium and n-butyl lithium (molar ratio 2:3) as the co-initiator, and modifier III(f) at various modifier to co-initiator ratios at several temperatures, all other conditions being maintained substantially constant. The 1,2-contents of the polybutadienes obtained in these manners are summarized in the following Table XI.

TABLE XI

Affect of Temperature and Modifier/Co-Initiator Ratio on Percent 1,2-Content in Polybutadiene

| Temp. °C. | III(f)/Co-Initiator | | | |
|---|---|---|---|---|
| | 0.3 | 0.6 | 1.2 | 2.4 |
| 5 | 97 | 98 | — | 100 |
| 30 | 87 | 94 | — | 100 |
| 50 | 69 | 81 | — | — |
| 70 | 48 | 69 | — | 86 |
| 100-120 | — | 30 | 43 | 63 |

The polymers produced in accordance with the process of this invention are useful for the formation of injection moldings, compression moldings, extrusions, film coatings, spray coatings, adhesives, and also for the formation of latices from which foam or dipped goods may be prepared. The polymers also may be mixed with other rubbery polymers for obtaining improvements in the physical properties. The polymers of the present invention, either alone or combined with other rubbery polymers may be mixed with the usual rubber compounding materials such as carbon blacks, fillers, processing oils, etc., and provide excellent physical properties when molded into tires and other fabricated articles.

I claim:

1. A catalyst system comprising
   (a) at least one anionic initiator based on lithium, and
   (b) at least one cyclic acetal of a glyoxal.

2. The catalyst system of claim 1 wherein the anionic initiator is a hydrocarbyl lithium compound containing from about 1 to 20 carbon atoms.

3. The catalyst system of claim 2 wherein the hydrocarbyl lithium compound is n-butyl lithium.

4. The catalyst system of claim 1 wherein the cyclic acetal (b) is characterized by the formula

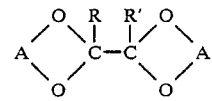

wherein R and R' are each independently hydrogen, alkyl or aryl groups, and each A is independently an alkylene or oxyalkylene group.

5. The catalyst system of claim 4 wherein the alkylene group A is a straight chain or branched chain alkylene or oxyalkylene group containing from 2 to about 10 carbon atoms.

6. The catalyst system of claim 5 wherein R and R' are each hydrogen.

7. The catalyst system of claim 1 wherein the cyclic acetal (b) is prepared by reacting a glyoxal with an alkylene or oxyalkylene diol.

8. The catalyst system of claim 1 also containing
   (c) at least one organomagnesium compound, organoaluminum compound or mixtures thereof.

9. The catalyst system of claim 8 wherein the organomagnesium compound is a dihydrocarbyl magnesium compound and the organoaluminum compound is a trihydrocarbyl aluminum compound.

10. The catalyst system of claim 8 wherein the hydrocarbyl groups contain from 1 to about 20 carbon atoms.

11. The catalyst system of claim 1 wherein the molar ratio of (a) to (b) is from about 1:0.05 to about 1:20.

12. The catalyst system of claim 8 wherein the molar ratio of (a) to (b) is from about 1:0.05 to about 1:20, and the molar ratio of (a) or [(a)+(c)] to (b) is from about 1:0.05 to about 1:20.

* * * * *